Feb. 11, 1930. L. F. GITS 1,746,999
VALVE CAP
Filed April 11, 1928
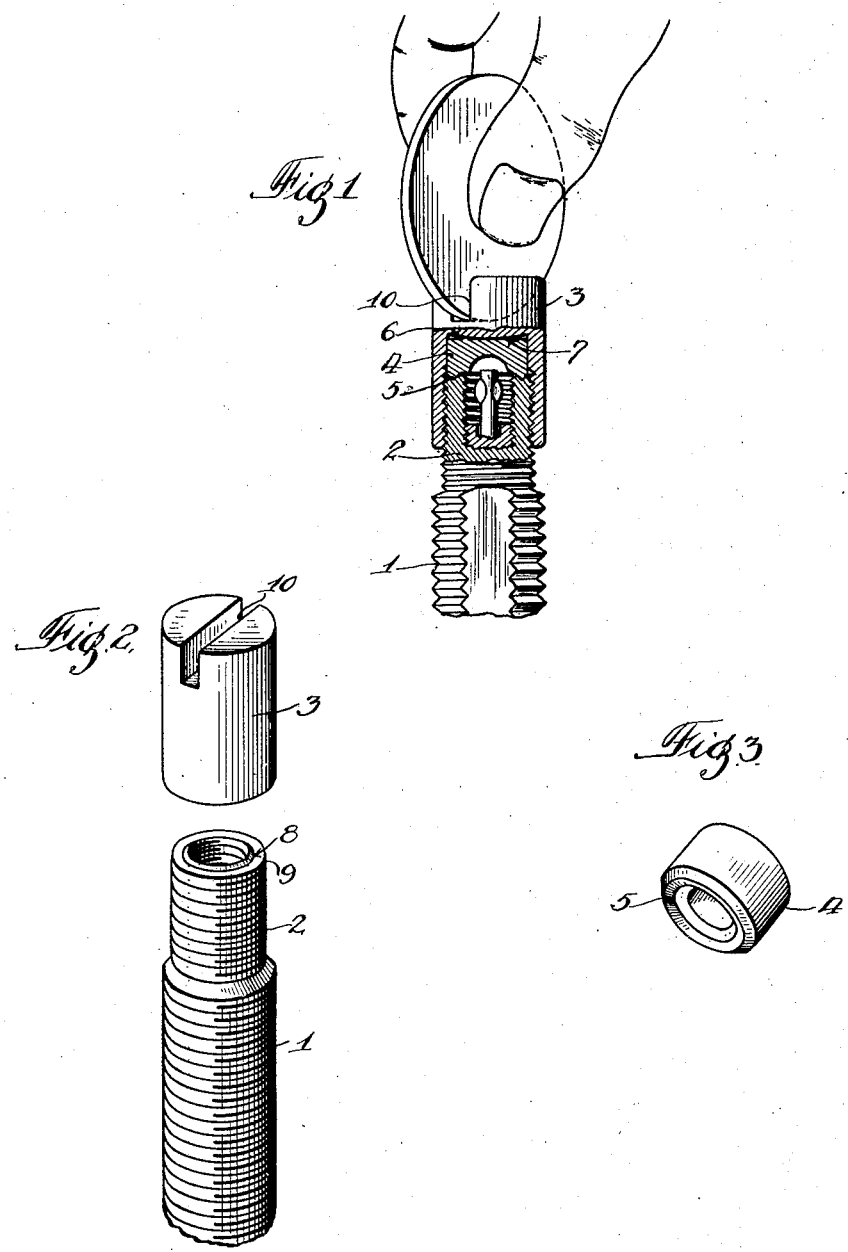
Inventor
Louis F. Gits Patented Feb. 11, 1930

1,746,999

UNITED STATES PATENT OFFICE

LOUIS F. GITS, OF CHICAGO, ILLINOIS, ASSIGNOR, BY DIRECT AND MESNE ASSIGNMENTS, TO JULES P. GITS, OF CHICAGO, ILLINOIS

VALVE CAP

Application filed April 11, 1928. Serial No. 269,028.

This invention relates to a certain new and useful improvement in valves and more particularly to an improved form of cap providing an air-tight fit to prevent loss of air.

Although it is apparent that this invention is particularly adaptable to a type of valve associated with the pneumatic inner tube of an automobile tire, it will be noticed that the invention is not to be limited to this use solely but may also be adapted to other various analogous and nonanalogous uses.

It has been found that caps heretofore provided to cover the open end of the usual air valves of pneumatic tires did not maintain an air-tight relation with the casing on which they were threaded or otherwise secured. Gaskets of rubber or like yieldable material have been used within the cap to engage the casing, but such gaskets would soon rot or deteriorate to the extent of losing the air-tight fit. As a result, after the caps had been threaded into the valve casings a number of times, they would be useless as air-tight closures, and their replacement would be essential if such air-tight fit were to be maintained by the owner of the vehicle.

The primary object of my invention resides in the provision of an improved form of means of maintaining an air-tight fit between the cap and casing, and, to embody such means in the cap, so that the tighter the cap is drawn, irrespective of the number of times it is used, the more secure the joint is made against any possible leakage of air.

More particularly the invention relates to the provision of a metallic insert in the cap, which serves the purpose of a gasket, and which is provided with a relatively sharp edge adapted to engage or bite into the upper edge of the valve casing, whereby, as the cap is threaded into position, an air-tight fit will be provided.

A further object of my invention is to provide the aforesaid metallic insert, which acts as a gasket, of harder material than that of the valve casing so that the edge thereof may continually bite into the upper edge of the casing as the cap is threaded into position, to maintain a self-worn seat and thereby provide a relatively permanent air-tight fit.

In order to apprise those skilled in the art how to construct and practice my invention, I shall now describe the preferred embodiments thereof in connection with the accompanying drawings, in which—

Figure 1 is a vertical sectional view of a tire casing provided with a cap, partly in elevation, which embodies my invention;

Fig. 2 is an elevational view of the device with the cap in removed position to illustrate the self-forming seat at the tip of the casing; and Fig. 3 is a perspective view of the insert to illustrate the aforesaid relatively sharp edge.

It will be understood that my invention is capable of embodiment in many forms or types of valves and consequently I do not desire to be limited to the type of valve shown in the drawing which is commonly used in connection with pneumatic inner tubes of automobile tires. Referring more in detail to the accompanying drawing, it will be observed that the valve casing 1 is threaded in the usual manner along the lower portion and is reduced in diameter at the end 2, which is also threaded for the purpose of receiving an internally threaded cap 3. The particular form of cap 3 is not of the essence of this invention as long as it is adapted to receive an insert 4 acting in the nature of a gasket for providing an air-tight fit between the valve casing and cap 3.

It will be observed that insert 4 is preferably provided in the form of a disc having an annular sharp edge 5. Upper face 6 of insert 4 is preferably flat so as to readily cooperate with the inner face 7 of cap 3. I find that it is easier to adapt insert 4 within cap 3 if face 6 is made flat.

One of the purposes of this invention is to provide insert 4, acting as a gasket, of harder material, such as steel, than the material of valve casing 1. Valve casing 1 is usually made of brass or some like soft material, and consequently, sharp edge 5 is adapted to form a self-forming seat 8 in the upper face 9 of neck 2. I find that it is not necessary, although it may be desirable, to originally provide a groove 8 in the upper end of neck 2, inasmuch as the cap when threaded tightly in position will permit this sharp angular edge 5 to wear or form in a self-acting manner this groove 8, whereby the cooperation of the sharp edge and the groove results in maintaining a preferably tight fit, preventing the escape of air from the upper end of valve casing 1.

It will be understood that insert 4, shown herein as the gasket of cap 3, need not have any particular shape in order to embody the principles of this invention. The invention relates mainly to the provision of a sharp edge on the gasket which is of harder material or metal than that of the valve casing so that this sharp edge may maintain a self-forming seat to prevent the escape of air. The metal may be made of any desirable material as long as a relation exists between the material of the casing and the gasket whereby one may be harder than the other. I find, however, that it is desirable to provide insert 4 or the gasket of hardened steel so that the sharp edge 5 may have a relatively longer life.

If so desired, a diametrical slot 10 may be formed in the upper part of the cap so as to receive a sharp tool or edge, such as a coin may provide, for the purpose of threading cap 3 in position. The pressure applied to the cap will cause the sharp edge to bite into edge 9 of valve casing 1 and provide this self-forming seat 8 which, as I have stated, results in an air-tight fit and the prevention of the loss of air, which may escape past the valve in casing 1. I have found that with this air-tight fit, such as I have described, the usual evil of a leaking valve is wholly overcome inasmuch as it is impossible for air to escape past the edge 5 engaging in seat 8. The particular form or manner of attaching cap 3 to valve casing may be varied or changed according to the type of valve used.

Without further elaboration, the foregoing will so fully explain the gist of my invention, that others may, by applying current knowledge, readily adapt the same for use under varying conditions of service, without eliminating certain features, which may properly be said to constitute the essential items of novelty involved, which items are intended to be defined and secured to me by the following claim.

I claim:

A valve-casing cap provided with a chamber and a metallic gasket disposed within said chamber, said gasket being of harder metal than the metal of the valve-casing, and having a substantially annular and relatively sharp edge adapted to bite into the valve-casing and provide a self-forming seat therefor.

In witness whereof, I have hereunto subscribed my name.

LOUIS F. GITS.